United States Patent [19]
Barnard et al.

[11] 3,819,233
[45] June 25, 1974

[54] GAS TURBINE VEHICLE EQUIPPED WITH PNEUMATIC BRAKES

[75] Inventors: Mark Cary Sedwick Barnard, Kenilworth; John Oliver Philip Hughes, Whitelead, Princes Risborough, both of England

[73] Assignee: British Leyland Truck and Bus Division Limited, Leyland, Lancashire, England

[22] Filed: Oct. 4, 1972

[21] Appl. No.: 294,895

[30]        Foreign Application Priority Data
   Oct. 12, 1971   Great Britain.................... 47339/71

[52] U.S. Cl.................................... 303/1, 303/10
[51] Int. Cl............................................. B60t 17/02
[58] Field of Search................................. 303/1, 10; 417/405–409, 426–429; 180/66 R, 66 A; 60/39.34; 244/111

[56]         References Cited
         UNITED STATES PATENTS
2,742,760   4/1956   Hodge............................. 180/66 A
3,053,043   9/1962   Knowler........................... 180/66 R
3,433,319   3/1969   McLean............................ 180/66 A

*Primary Examiner*—Duane A. Reger
*Assistant Examiner*—D. C. Butler
*Attorney, Agent, or Firm*—Brisebois & Kruger

[57]             ABSTRACT

In a gas turbine vehicle equipped with a pneumatic brake system, the compressor of the gas turbine engine is used to supply the quantity of air required for the brakes, and a separate engine-driven compressor is used to boost the pressure of this air to the extent necessary for operating the brake system. The separate engine-driven compressor is supplied, through a check valve and an air-cooled intercooler, with compressor delivery air from a tapping on the casing of the compressor of the gas turbine engine.

8 Claims, 4 Drawing Figures

GAS TURBINE VEHICLE EQUIPPED WITH PNEUMATIC BRAKES

This invention relates to gas turbine vehicles equipped with pneumatic brakes.

Pneumatically-operated brakes on heavy road vehicles require air at pressures of between 100 and 130 p.s.i. in fairly small quantities. The air is obtained from a storage bottle which is replenished by means of an engine-driven compressor.

In the case of a road vehicle which is driven by a gas turbine engine, and which has pneumatic brakes, the quantity of air required for the brakes is very small compared with the engine air flow, although the pressure required is generally considerably above that available from the engine.

According to the invention a gas turbine vehicle, equipped with a pneumatic brake system, is characterized by the use of the highly efficient compressor of the gas turbine engine to supply the quantity of air required for the brakes; and by the use of a separate engine-driven compressor to boost the pressure of this air to the extent necessary for operating the brake system.

By the invention, the size of the separate engine-driven compressor is reduced (which facilitates its locational installation on the engine); and the overall power abstracted from the engine, in order to maintain the brake air supply, is reduced.

Referring to the accompanying drawings.

Figure 1:
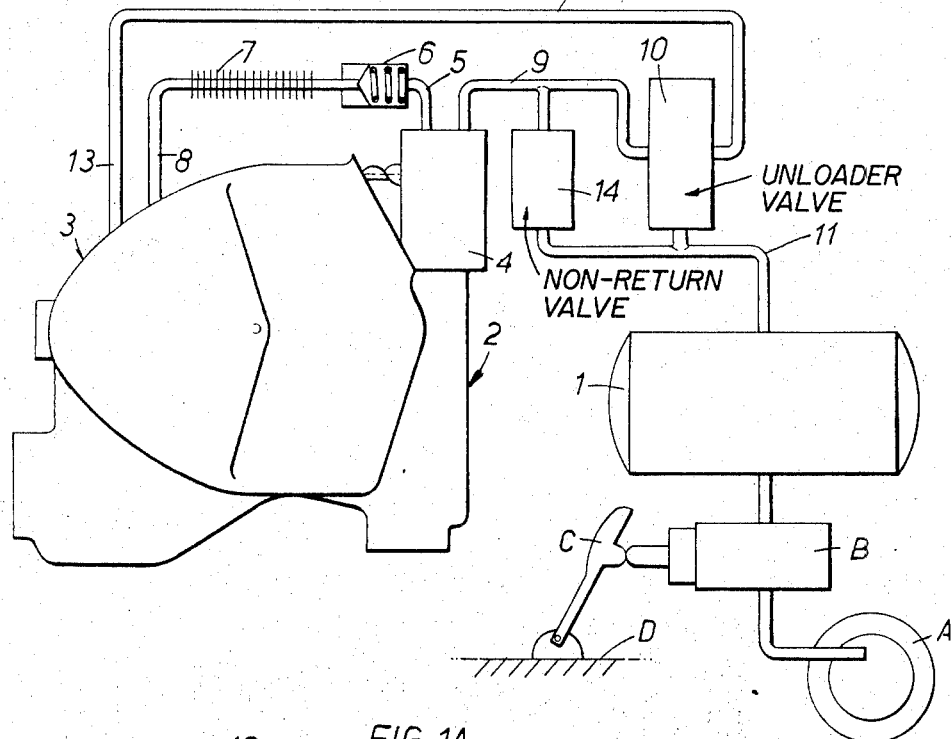
FIG. 1 illustrates schematically an installation which exemplifies how the invention is applied to a gas turbine vehicle equipped with a pneumatic brake system.

A gas turbine road vehicle, equipped with a pneumatic brake system A of conventional design, has a storage bottle 1 from which air at pressures of between 100 and 130 p.s.i. can be supplied to operate the brakes via a brake valve B which is operable by a pedal C mounted on the vehicle structure D. In accordance with the invention, the vehicle's gas turbine engine 2 has its compressor 3 arranged to supply, to the storage bottle 1, the quantity of air required for the brakes; and a separate compressor 4, driven by the engine 2, boosts the pressure of this air to the extent necessary for operating the brake system A.

The separate compressor 4 is driven from a shaft on the usual accessory drive pad of the engine 2, and is supplied, through a pipe 5, a check valve 6 and an air-cooled intercooler 7, with compressor delivery air from a tapping 8 on the casing of the compressor 3. The check valve 6 ensures that the engine 2 is not loaded (i.e., with the auxiliary air supply) during starts.

The high-pressure air from the separate compressor 4 is delivered, through a line 9, to an unloader valve 10 which directs the air either through a line 11 to the storage bottle 1 or, via a line 12, back to a tapping 13 on the casing of the compressor 3, at its air-intake zone.

The unloader valve 10 (of known design) is operated by a signal which represents the pressure in the storage bottle 1, the operation of this valve being such that the air is recirculated back to the engine when the pressure reaches a selected maximum value, and the compressor 4 replenishes the storage bottle 1 when the pressure falls below a selected minimum value.

Figure 1A:
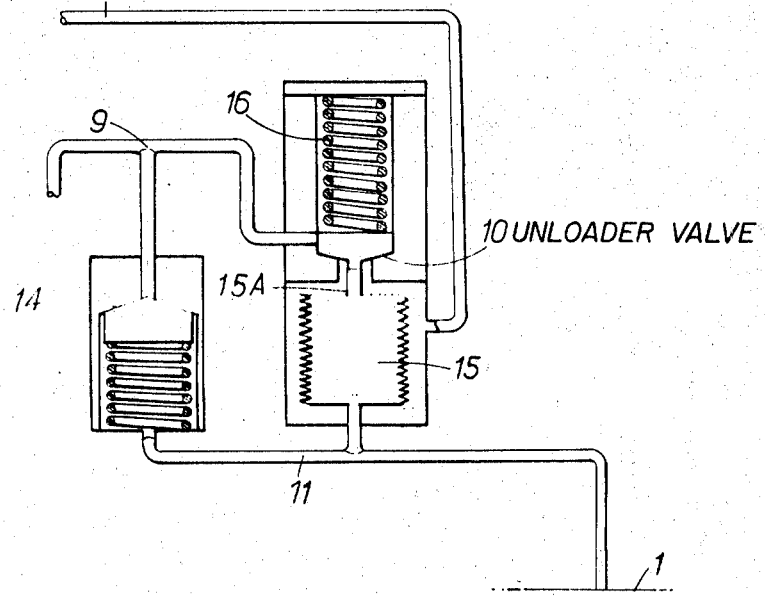
FIG. 1A is an enlarged fragmentary schematic view showing details of two valves pertaining to the installation depicted in FIG. 1.

Air from the compressor 4 enters both a non-return valve 14 and (see FIG. 1A) the upper side of the unloader valve 10 which, for convenience, may be contained within the same casing. The delivery line 11 from the spring-loaded non-return valve 14 to the storage bottle 1 also supplies air to pressurize metal bellows 15 located on the underside of the unloader valve 10. When the air-pressure in the bottle 1 reaches the selected maximum value, the bellows 15, through its push-pin 15A, overcomes the spring-loading applied by a compression spring 16 above the unloader valve 10 and thus lifts the valve off its seat, allowing air from the compressor 4 to pass through the unloader valve 10 into the line 12 which takes it back to the engine 2. The compressor pressure is thus reduced and the non-return valve 14 closes, preventing further delivery to the storage bottle 1.

When the air-pressure in the storage bottle 1 falls below the selected minimum value (usually 25 p.s.i. below the selected maximum value) the spring 16 closes the unloader valve 10, so that compressor pressure is able to open the non-return valve 14 and the storage bottle 1 is recharged.

If the air-pressure in the storage bottle 1 is at or below the pressure of the air supplied by the engine to the compressor 4, then the engine air passes through the compressor and the non-return valve 14 to the storage bottle 1 without assistance from the compressor, and hence the power required by the compressor is at a minimum.

Figure 2:
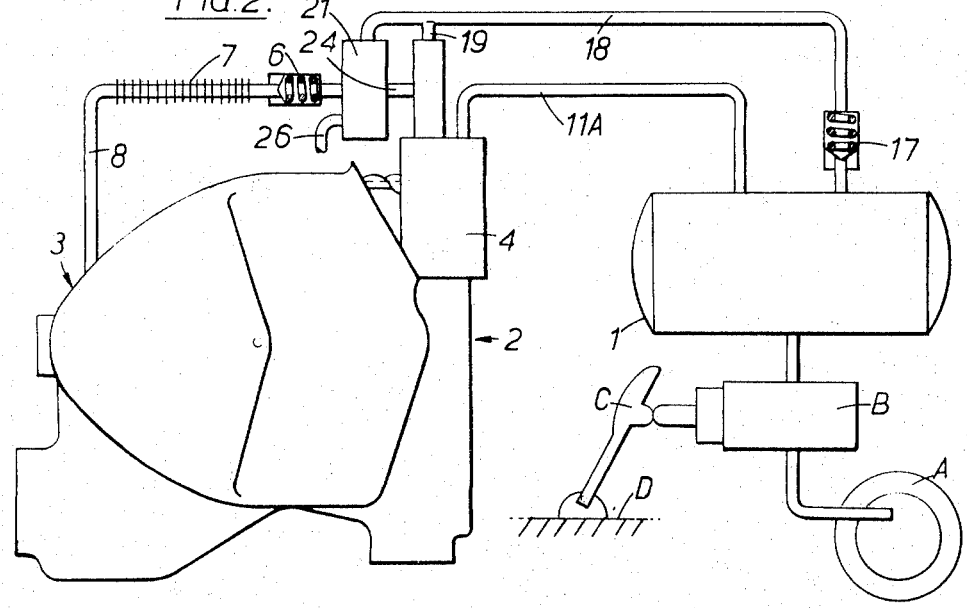
FIG. 2 illustrates schematically a variant of the installation depicted in FIG. 1.
Figure 2A:
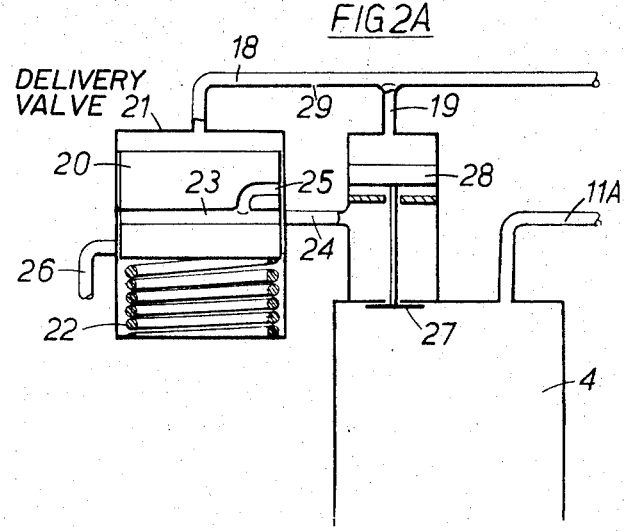
FIG. 2A is an enlarged fragmentary schematic view showing details of parts of the alternative installation illustrated in FIG. 2.

FIG. 2 depicts an alternative method of unloading the compressor 4 when the storage bottle 1 is fully charged via a delivery line 11A from the compressor. The signal in this case occurs when the air-pressure in the storage bottle 1 is sufficient to overcome the spring-loading on a pressure-control valve 17 (of known design), so that pipes 18 and 19 become charged with air at this pressure. The signal pressure in the pipe 18 moves a spring-loaded piston 20 (see FIG. 2A) in a delivery valve 21 for air from the engine's compressor 3. Under the action of a compression spring 22 the piston 20 is in a position such that a main drilling 23 within it enables the air from the engine to be delivered to a duct 24 which is the compressor intake duct. But when the pressure in the pipe 18 overcomes the spring 22, the piston 20 moves to a position such that a branch drilling 25 within it registers with the compressor intake duct 24, and the main drilling 23 now registers with an atmospheric vent 26. Consequently, the compressor intake duct 24 has become vented to atmosphere and air supply from the engine ceases.

The compressor 4 normally has its inlet valve 27 closed when the pressure in its cylinder exceeds the pressure in the intake duct 24. Signal pressure in the pipe 19 moves a piston 28 which is connected directly to the inlet valve 27 of the compressor 4 and is able to hold this valve open.

When the air-pressure in the storage bottle 1 falls below the selected minimum value, the pressure-control valve 17 (FIG. 2) closes and signal pressure in the pipes 18 and 19 is reduced by means of a small vent 29 in the pipe 18.

We claim:

1. A wheeled gas turbine vehicle equipped with:
   a. a gas turbine for propulsion of the vehicle including a compressor and at least one turbine stage;
   b. a booster compressor driven by the gas turbine;
   c. a pneumatic brake system linked to
   d. compressed air storage means;
   e. a bleed line linking the compressor to the booster compressor;
   f. a first output line linking the booster compressor to the compressor;
   g. a second output line linking the booster compressor to the air storage means; and
   h. control means adapted to direct the output of the booster compressor:
      i. to the storage means when the air pressure in the storage means is below a given value; and
      ii. to the compressor when the air pressure in the storage means is at least the given value.

2. A wheeled gas turbine vehicle as claimed in claim 1 wherein the bleed line includes a check valve and an air cooled intercooler.

3. A wheeled gas turbine vehicle as claimed in claim 1 wherein said control means includes an unloader valve in said first output line operable by a signal representative of the pressure in the storage means; the operation of the unloader valve being such that the air is recirculated back to the compressor when the pressure in the storage means reaches a selected maximum value, and the booster compressor replenishes the storage means when the pressure therein falls below the given value.

4. A wheeled gas turbine vehicle as claimed in claim 3 in which said control means further comprises:
   a. a spring loaded non-return valve in the second output line; and
   b. a bellows in said second output line linked to the unloader valve so that, when the air pressure in the storage means exceeds the given value, the bellows acts to unseat the unloader valve so allowing air from the booster compressor to pass by way of the unloader valve back to the compressor.

5. A wheeled gas turbine vehicle as claimed in claim 4 in which, when the air pressure in the storage means falls below the given value, the unloader valve is adapted to close so that the non-return valve is opened by way of the air pressure from the booster compressor so enabling the storage means to be recharged.

6. A gas turbine vehicle according to claim 1, in which the booster compressor delivers high-pressure air to a storage bottle fitted with a spring-loaded pressure-control valve from which a return line leads back to a spring-loaded delivery valve for air from the compressor of the gas turbine engine; the delivery valve, which supplies the last-mentioned air to the intake of the separate compressor, is movable against its spring-loading by the pressure signal established in the return line when the pressure-control valve opens in consequence of the storage bottle having become fully charged; and, as a result of movement of the delivery valve against its spring-loading, the intake of the booster compressor becomes vented to atmosphere and air supply from the compressor of the gas turbine engine ceases.

7. A gas turbine vehicle according to claim 6, in which the return line from the pressure-control valve is also employed to convey the pressure signal to a piston which is connected directly to the inlet valve of the booster compressor and which, in response to the pressure signal, holds this valve open.

8. A gas turbine vehicle according to claim 7, in which, when the air-pressure in the storage bottle falls below the selected minimum value, the pressure-control valve closes and the signal pressure in the return line is reduced by a small vent provided in that line.

* * * * *